(12) United States Patent
Boariu et al.

(10) Patent No.: US 8,737,326 B2
(45) Date of Patent: May 27, 2014

(54) ALLOCATING RESOURCE UNITS TO A MOBILE STATION

(75) Inventors: Adrian Boariu, Suceava (RO); Shashikant Maheshwari, Irving, TX (US); Haihong Zheng, Coppell, TX (US)

(73) Assignee: Nokia Siemens Networks Oy, Espoo (FI)

( * ) Notice: Subject to any disclaimer, the term of this patent is extended or adjusted under 35 U.S.C. 154(b) by 235 days.

(21) Appl. No.: 13/124,321

(22) PCT Filed: Sep. 22, 2009

(86) PCT No.: PCT/EP2009/062240
§ 371 (c)(1),
(2), (4) Date: Jun. 24, 2011

(87) PCT Pub. No.: WO2010/049217
PCT Pub. Date: May 6, 2010

(65) Prior Publication Data
US 2011/0249644 A1 Oct. 13, 2011

Related U.S. Application Data

(60) Provisional application No. 61/109,087, filed on Oct. 28, 2008.

(51) Int. Cl.
*H04W 4/00* (2009.01)
*H04B 7/00* (2006.01)
*H04W 72/00* (2009.01)
*H04L 27/28* (2006.01)

(52) U.S. Cl.
USPC ............ 370/329; 455/509; 455/450; 375/260

(58) Field of Classification Search
USPC .......................... 370/253–340; 709/201–213
See application file for complete search history.

(56) References Cited

U.S. PATENT DOCUMENTS

2002/0110106 A1 8/2002 Koo et al.
2008/0090584 A1 4/2008 Kim et al.
(Continued)

FOREIGN PATENT DOCUMENTS

WO WO2006013741 * 5/2006
WO WO2006130741 * 12/2006
WO WO 2006130741 A1 * 12/2006

OTHER PUBLICATIONS

The Draft IEEE 802.16m System Description Document, IEEE 802.16 Broadband Wireless Access Working Group, IEEE 802.16m-08/003r5, http:// ieee802.org/16, , Oct. 3, 2008, pp. 1-122.

(Continued)

*Primary Examiner* — Ayaz Sheikh
*Assistant Examiner* — Debebe Asefa
(74) *Attorney, Agent, or Firm* — Brake Hughes Bellermann LLP

(57) ABSTRACT

Various example embodiments are disclosed. According to one example, a method may include permuting, by a superordinate station in a wireless network, physical resource units to logical resource units, the physical resource units of sequential logical resource units being noncontiguous. The method may also include sending at least one allocation message allocating a block of sequential logical resource units to each of a plurality of mobile stations, each of the allocated blocks being contiguous with at least one other allocated block. The method may also include de-allocating at least a first block of sequential logical resource units from a first mobile station selected from the plurality of mobile stations and a second block of sequential logical resource units from a second mobile station selected from the plurality of mobile stations, the first block of sequential logical resource units being noncontiguous with the second block of logical resource units. The method may also include sending at least one re-allocation message allocating the first block of sequential logical resource units and at least a portion of the second block of logical resource units to a new mobile station.

13 Claims, 14 Drawing Sheets

(56) References Cited

U.S. PATENT DOCUMENTS

| | | | |
|---|---|---|---|
| 2008/0165881 A1* | 7/2008 | Tao et al. | 375/267 |
| 2009/0196177 A1* | 8/2009 | Teyeb et al. | 370/231 |
| 2010/0022245 A1* | 1/2010 | Sato | 455/436 |

OTHER PUBLICATIONS

Chinese Office Action for Chinese Application No. 200980152963.0, dated Jun. 3, 2013, along with English translation, 19 pages.

Hamiti, "The Draft IEEE 802.16m System Description Document", Nokia, IEEE 802.16 Broadband Wireless Access Working Group, XP-00256197, Oct. 3, 2008, pp. 1-122.

IEEE, "Part 16: Air Interface for Fixed Broadband Wireless Access Systems", IEEE Standard for Local and Metropolitan area Networks, IEEE Computer Society and the IEEE Microwave Theory and Techniques Society, IEEE New York, NY IEEE Std., IEEE Std 802.16-2004, Oct. 1, 2004, 893 pages.

IEEE, "IEEE Standard for Information Technology—Telecommunications and information exchange between systems—Local and metropolitan area networks—Specific requirements", Part 11: Wireless LAN Medium Access Control (MAC) and Physical Layer (PHY) Specifications; IEEE Computer Society, IEEE Std. 802.11-2007, Jun. 12, 2007, 1232 pages.

Moon, et al., "Persistent allocation method for reducing MAP overhead", IEEE 802.16 Broadband Wireless Access working Group, XP002567198, Jan. 22, 2008, pp. 1-21.

* cited by examiner

ALLOCATING RESOURCE UNITS TO A MOBILE STATION

PRIORITY CLAIM

This application is a national stage entry of PCT Application No. PCT/EP2009/062240, filed on Sep. 22, 2009, entitled "Allocating Resource Units to a Mobile Station", which, in turn, claims the benefit of priority based on U.S. Provisional Application No. 61/109,087, filed on Oct. 28, 2008, entitled "Allocating Resource Units to a Mobile Station", the disclosures of which are hereby incorporated by reference in their entirety.

TECHNICAL FIELD

This description relates to wireless networks.

BACKGROUND

In wireless networks, superordinate stations, such as base stations, relay stations, node Bs, or access nodes, may allocate resources to mobile stations for communication with the superordinate station. When mobile stations exit the network, such as by powering down or leaving a cell served by the superordinate station, the resources may be de-allocated from the exiting mobile stations, and reserved for future use. When new mobile stations enter the wireless network, the de-allocated resource may be re-allocated to the new mobile stations.

SUMMARY

According to one general aspect, a method may include permuting, by a superordinate station in a wireless network, physical resource units to logical resource units, the physical resource units of sequential logical resource units being noncontiguous. The method may also include sending at least one allocation message allocating a block of sequential logical resource units to each of a plurality of mobile stations, each of the allocated blocks being contiguous with at least one other allocated block. The method may also include de-allocating at least a first block of sequential logical resource units from a first mobile station selected from the plurality of mobile stations and a second block of sequential logical resource units from a second mobile station selected from the plurality of mobile stations, the first block of sequential logical resource units being noncontiguous with the second block of logical resource units. The method may also include sending at least one re-allocation message allocating the first block of sequential logical resource units and at least a portion of the second block of logical resource units to a new mobile station.

According to another general aspect, a method may include receiving, by a mobile station in a wireless network, a resource re-allocation message from a superordinate node, the resource re-allocation message allocating at least two noncontiguous blocks of logical resource units to the mobile station, each of the logical resource units being associated with a physical resource unit by a permutation. The method may also include sending data to or receiving data from the superordinate node via the physical resource units associated with the allocated logical resource units.

According to another general aspect, an apparatus may include a processor. The processor may be configured to permute physical resource units to logical resource units, the physical resource units of sequential logical resource units being noncontiguous. The processor may also be configured to generate at least one allocation message allocating a block of sequential logical resource units for each of a plurality of mobile stations, each of the allocated blocks being contiguous with at least one other allocated block. The processor may also be configured to de-allocate at least a first block of sequential logical resource units from a first mobile station selected from the plurality of mobile stations and a second block of sequential logical resource units from a second mobile station selected from the plurality of mobile stations, the first block of sequential logical resource units being noncontiguous with the second block of logical resource units. The processor may also be configured to generate at least one re-allocation message allocating the first block of sequential logical resource units and at least a portion of the second block of logical resource units for a new mobile station.

According to another general aspect, an apparatus may include a processor. The processor may be configured to process a resource re-allocation message received from a superordinate node, the resource re-allocation message allocating at least two noncontiguous blocks of logical resource units to the apparatus, each of the logical resource units being associated with a physical resource unit by a permutation. The processor may also be configured to generate data for or process data received from the superordinate node via the physical resource units associated with the allocated logical resource units.

According to another general aspect, a computer program product for a superordinate station serving a plurality of mobile stations in a wireless network may be tangibly embodied on a computer storage medium and include executable code. When executed, the code may be configured to cause the superordinate station to permute physical resource units to logical resource units, the physical resource units of sequential logical resource units being noncontiguous, send at least one allocation message allocating a block of sequential logical resource units to each of a plurality of mobile stations, each of the allocated blocks being contiguous with at least one other allocated block de-allocate at least a first block of sequential logical resource units from a first mobile station selected from the plurality of mobile stations and a second block of sequential logical resource units from a second mobile station selected from the plurality of mobile stations, the first block of sequential logical resource units being noncontiguous with the second block of logical resource units, and send at least one re-allocation message allocating the first block of sequential logical resource units and at least a portion of the second block of logical resource units to a new mobile station.

According to another general aspect, a computer program product for a mobile station may be tangibly embodied on a computer storage medium and include executable code. When executed the code may be configured to cause the mobile station, which is served by a superordinate station, to receive a resource re-allocation message from the superordinate node, the resource re-allocation message allocating at least two noncontiguous blocks of logical resource units to the mobile station, each of the logical resource units being associated with a physical resource unit by a permutation, and send data to or receive data from the superordinate node via the physical resource units associated with the allocated logical resource units.

The details of one or more implementations are set forth in the accompanying drawings and the description below. Other features will be apparent from the description and drawings, and from the claims.

DETAILED DESCRIPTION

Figure 1A:
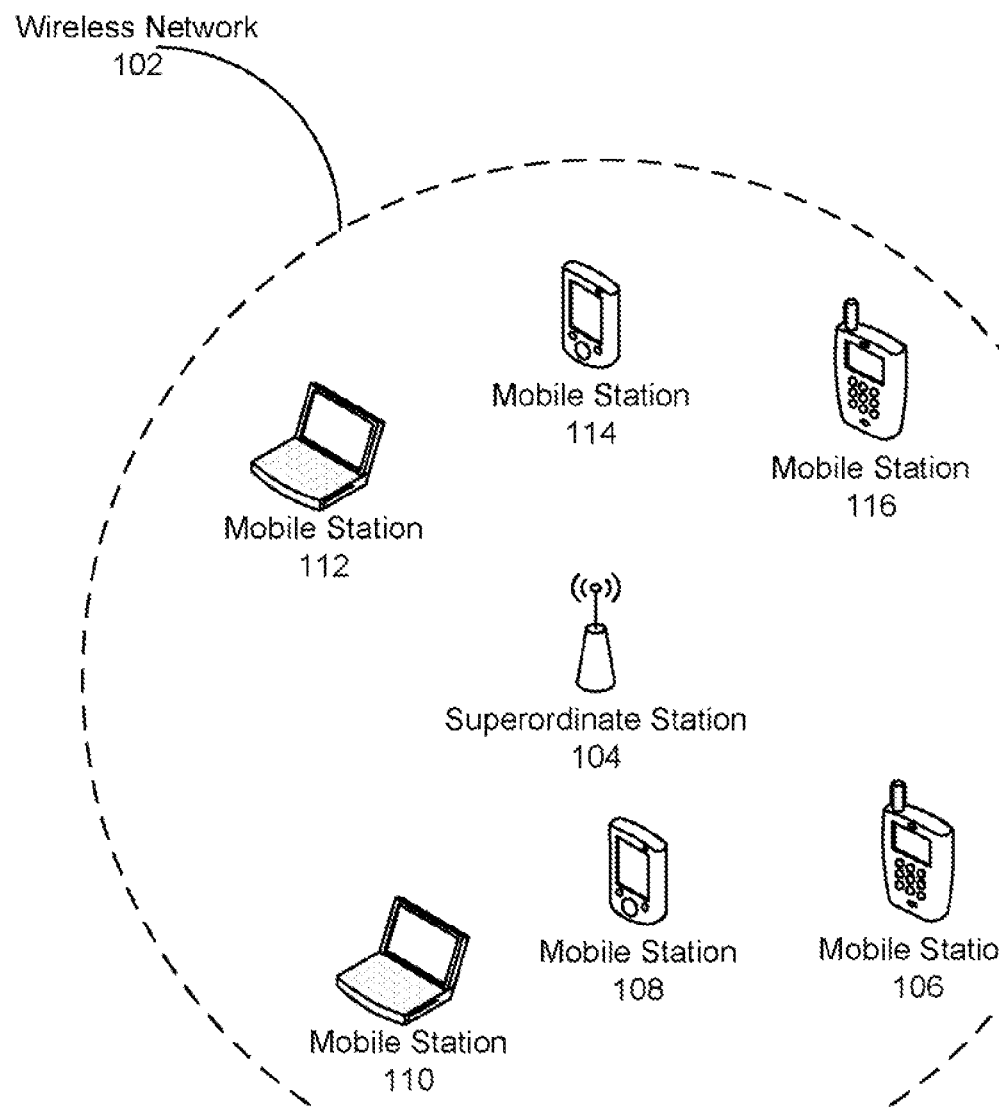
FIG. 1A shows a wireless network according to an example embodiment.

FIG. 1A shows a wireless network 102 according to an example embodiment. The wireless network 102 may include, for example, an IEEE 802.16 Worldwide Interoperability for Microwave Access (WiMAX) network, a Third Generation Partnership Project (3GPP) Long Term Evolution (LTE) network, an IEEE 802.11 Wireless Local Area Network (WLAN), or a cellular telephone network, according to example embodiments. The wireless network 102 may provide wireless data stations to users or subscribers who enter the wireless network 102.

The wireless network 102 may include a superordinate station 104. The superordinate station 104 may provide wireless (or unguided) data and/or voice service to mobile stations 106, 108, 110, 112, 114, 116 via an air interface. The superordinate station 104 may, for example, send data to the mole stations 106, 108, 110, 112, 114, 116 in a downlink (DL) direction, and may receive data from the mobile stations 106, 108, 110, 112, 114, 116 in an uplink (UL) direction. The superordinate station 104 may include a base station, node B, or access point, according to example embodiments. The superordinate station 104 may connected to a data network, such as the Internet, via a wired or guided connection to a backhaul network.

Figure 1B:
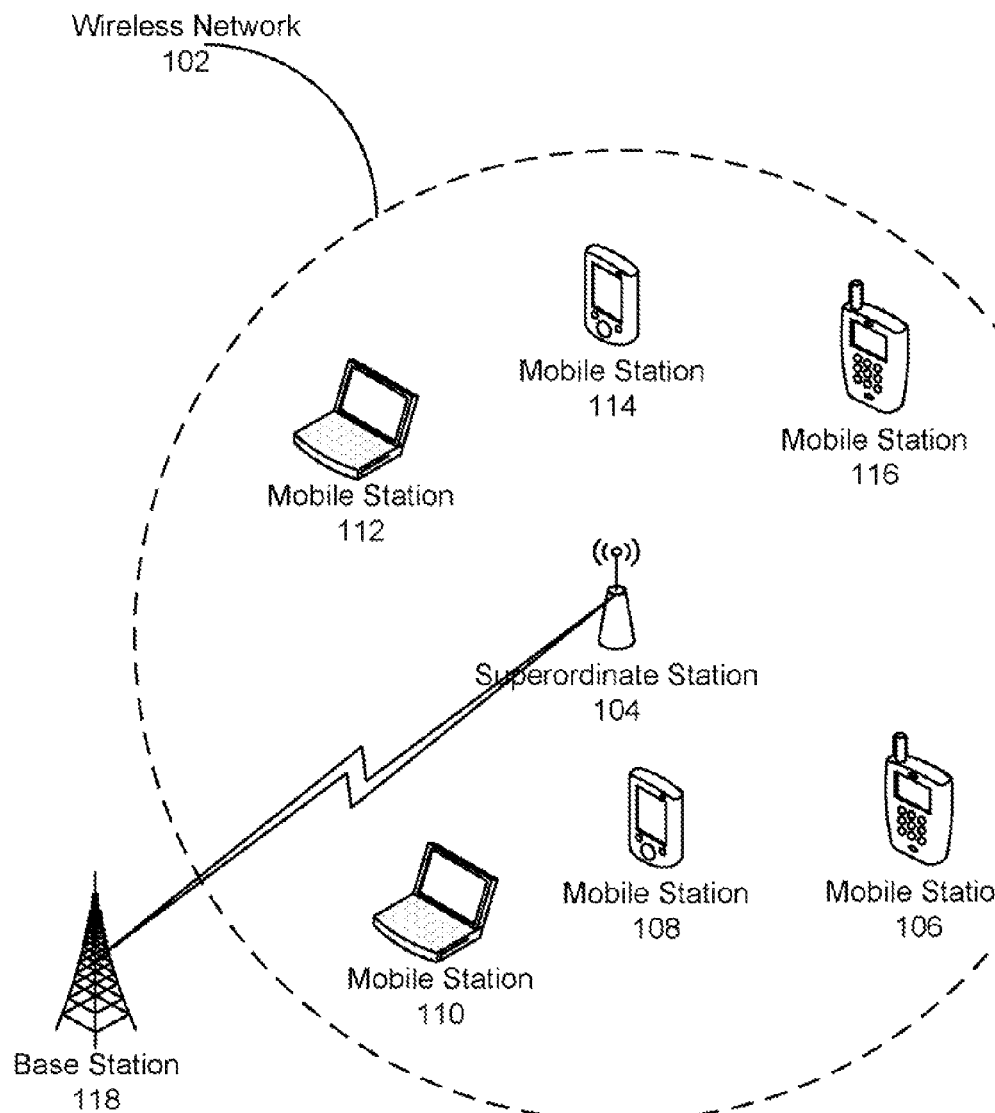
FIG. 1B shows a wireless network according to another example embodiment.

FIG. 1B shows a wireless network 102 according to another example embodiment. In this example, the superordinate station 104 may include a relay station. The superordinate station 104 may provide data and/or voice service to the mobile stations 106, 108, 110, 112, 114, 116, as described above with reference to FIG. 1A. However, in this example, the superordinate station 104 may not be directly connected to the data network or Internet, but instead may be in wireless or unguided communication with a base station 118 (or with another relay station which may be in communication with the base station 118 directly via an air interface or via one or more additional relay stations) via an air interface. The base station 118 may be connected to the data network or Internet via the wired or guided connection to the backhaul network, thereby providing the superordinate station 104 or relay station with access to the data network or Internet.

Referring to either FIG. 1A or FIG. 1B, the mobile stations 106, 108, 110, 112, 114, 116 may provide data service to a user or subscriber by wirelessly (or without a guided medium) communicating with the superordinate station 104 via the air interface. The mobile stations 106, 108, 110, 112, 114, 116 may include cellular telephones, personal digital assistants (PDAs), smartphones, laptop or notebook computers, or other portable devices capable or processing data, receiving input from and providing output to a user, and communicating with the superordinate station 104 via the air interface. The mobile stations 106, 108, 110, 112, 114, 116 may send data to the superordinate station 104 in the uplink (UL) direction, and may receive data from the superordinate station 104 in the downlink direction.

The wireless network 102 may control access to the communication medium, such as the air interface, by allocating time slots to each of the mobile stations 106, 108, 110, 112, 114, 116 in a time domain, and/or one or more carrier frequencies with specified bandwidths to each of the mobile stations 106, 108, 110, 112, 114, 116 in a frequency domain. The wireless network 102 may, for example, assign physical resource units to each of the mobile stations 106, 108, 110, 112, 114, 116 for communication with the superordinate station 104 in each of the uplink and downlink directions. Physical resource units may include a time slot and a carrier frequency with a specified bandwidth for sending or receiving data.

Figure 2:
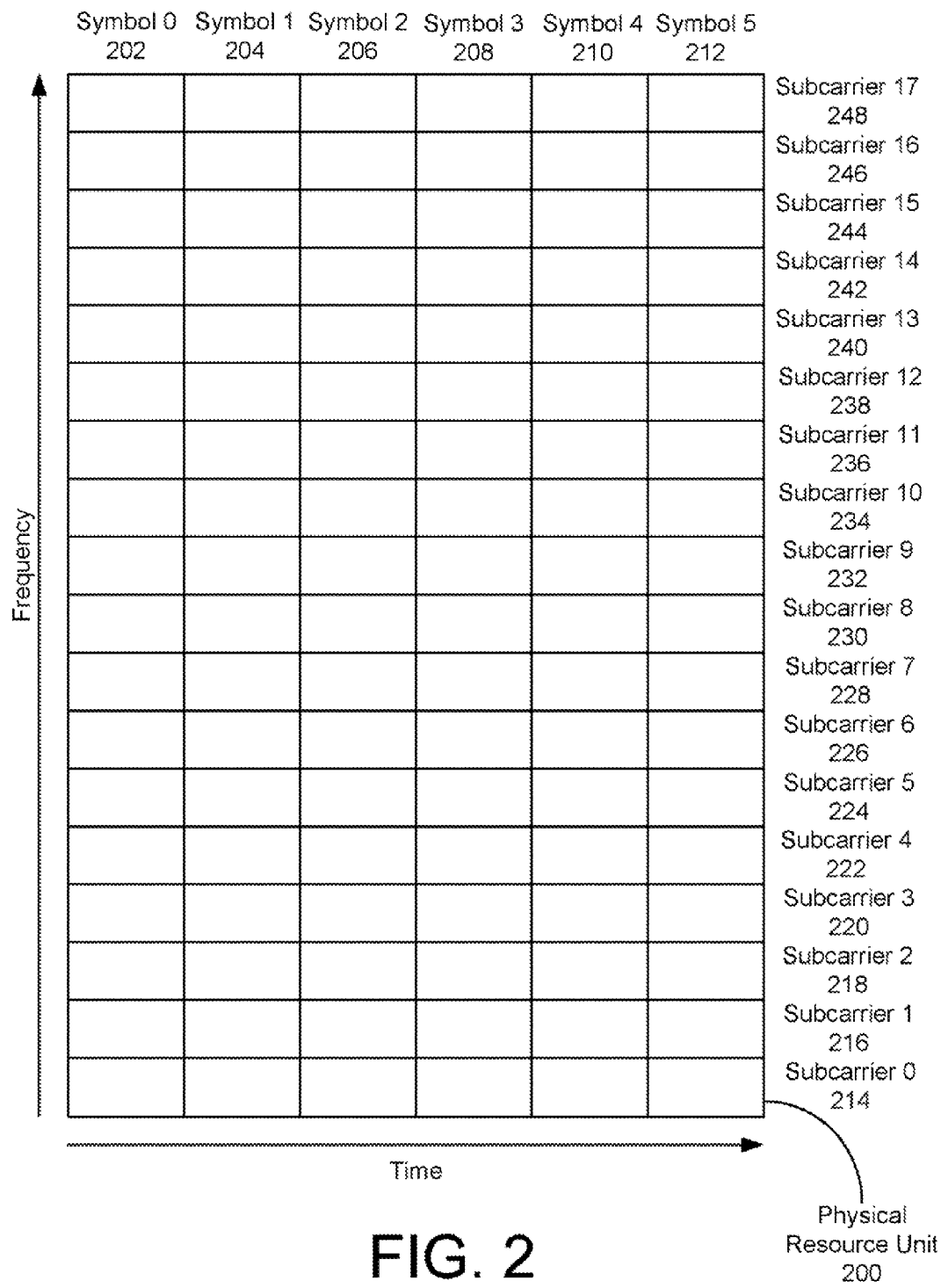
FIG. 2 shows a map of physical resource units according to an example embodiment.

FIG. 2 shows a map of physical resource units 200 according to an example embodiment. According to this example, the physical resource units 200 in the wireless network 102 may allocated to the mobile stations 106, 108, 110, 112, 114, 116 according to an orthogonal frequency division multiple access (OFDMA) method. In this example, data may be transmitted as symbols 202, 204, 206, 208, 210, 212 during specified time slots. The symbols 202, 204, 206, 208, 210, 212 may be specified in a periodic manner, such as a symbol 0 which is the first symbol in each group of six symbols, a symbol 1 which is the second symbol in each group of six symbols, etcetera. While the example shown in FIG. 2 shows six symbols 202, 204, 206, 208, 210, 212, any number of symbols may be used.

Also in this example, the frequency spectrum may be divided into a plurality of subcarriers 214, 216, 218, 220, 222, 224, 226, 228, 230, 232, 234, 236, 238, 240, 242, 244, 246, 248. The subcarriers may be specified sequentially, such as in either ascending or descending frequency order. The subcarriers may include specified carrier frequencies with specified bandwidths, such as 5 kHz, 10 kHz, or 15 kHz. These are merely examples. While eighteen subcarriers are shown in FIG. 2, any number of subcarriers may be allocated in the wireless network 102. A continuous group of subcarriers 214, 216, 218, 220, 222, 224, 226, 228, 230, 232, 234, 236, 238, 240, 242, 244, 246, 248 may make up a "carrier." For example, one thousand 10 kHz subcarriers 214, 216, 218, 220, 222, 224, 226, 228, 230, 232, 234, 236, 238, 240, 242, 244, 246, 248 may make up on 10 MHz carrier, with the 10 MHz carrier having a bandwidth of 10 MHz. Carriers may also have bandwidths other than 10 MHz. Physical resource units 200 may be allocated within a single such carrier, or within multiple carriers (i.e., the multiple carriers would occupy frequency bands which are not adjacent to each other), according to example embodiments.

Data may be transmitted via the physical resource units 200 allocated to the mobile stations 106, 108, 110, 112, 114, 116. The physical resource units 200 may be allocated by specifying the symbols numbers and subcarriers via which data will be sent or received. In an example embodiment, the physical resource units may be mapped to logical resource units. The logical resource units may each identify physical resource units by a single number, rather than by two numbers (the time slot or symbol and the carrier frequency, subcarrier, or subchannel). The network 102, such as via the superordinate station 104, may communicate to the mobile stations 106, 108, 110, 112, 114, 116 which physical resource units 200 via which the mobile stations 106, 108, 110, 112, 114, 116 will send and receive data by sending allocation messages to the mobile stations 106, 108, 110, 112, 114, 116 which include the logical resource units. The logical resource units allocated to a particular mobile station 106, 108, 110, 112, 114, 116 The mobile stations 106, 108, 110, 112, 114, 116 may map the logical resource units to the physical resource units which will be used to transmit or received data.

In order to achieve frequency and/or time diversity in data transmission and reception, the logical resource units may be mapped to the physical resource units 200 by a permutation. The wireless network 102, as well as the superordinate station 104 and/or mobile stations 106, 108, 110, 112, 114, 116, may permute the physical resource units 200 into logical resource units. The permutation may be performed in such a manner that sequential logical resource units will be associated with noncontiguous physical resource units 200. Noncontiguous physical resource units 200 may include physical resource units which are not adjacent to each other in the time domain (are not sequential symbols), and/or are not adjacent in the frequency domain (are not adjacent subcarriers, or do not occupy a continuous bandwidth).

Figure 3:
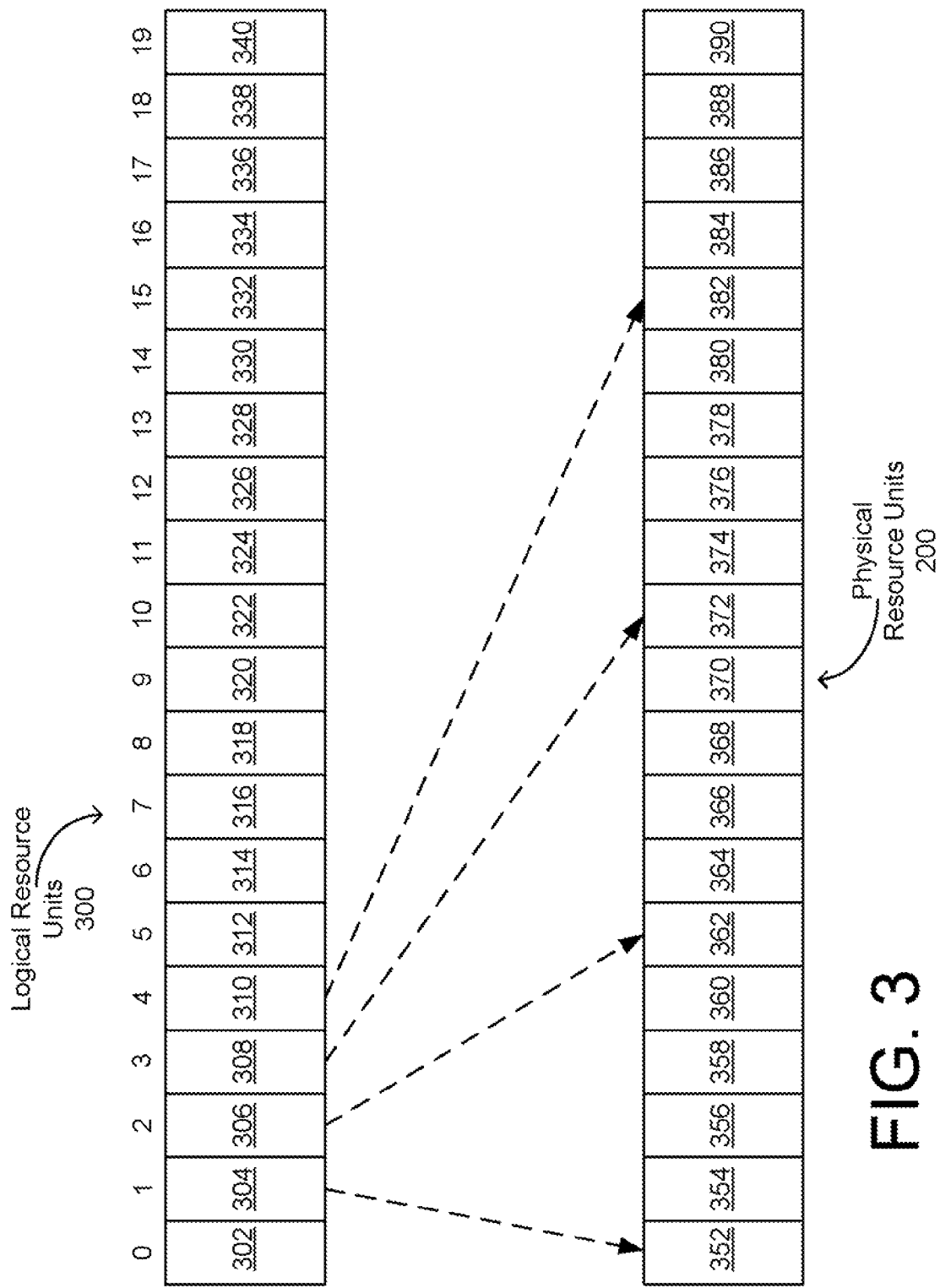
FIG. 3 shows a permutation of physical resource units to logical resource units according to an example embodiment.

FIG. 3 shows a permutation of physical resource units 200 to logical resource units 300 according to an example embodiment. As shown in this example, consecutive or sequential logical resource units 300 are not mapped to consecutive, sequential, or adjacent physical resource blocks 200 in the frequency domain. While this example shows permuted mapping in the frequency domain, the permutation may also be performed in the time domain, according to an example embodiment.

In this example, consecutive logical resource units 300 are permuted to physical resource blocks 200 which are five subcarriers apart. In other examples, consecutive logical resource units 300 may be permuted to physical resource units 200 which are any number of subcarriers apart, so long as the physical resource units 200 to which the consecutive logical resource units are mapped are not consecutive, sequential, or adjacent.

The logical resource units 300 may be mapped to the physical resource units 200 (or the physical resource units 200 mapped/permuted to the logical resource units 300) by any method which achieves frequency diversity in consecutive logical resource units, such as full usage of subchannels (FUSC), which maps logical subchannels onto physical subcarriers distributed throughout the entire physical channel or frequency spectrum as a function of IDCell (a number specific to the sector or cell served by the superordinate node 104), which changes with each OFDM symbol 202, 204, 206, 208, 210, 212; partial usage of subchannels (PUSC), which splits each physical channel into clusters of fourteen subcarriers, which are then mapped to six major groups as a function of the IDCell, and subsequently creates up to three segments out of the major groups; optional full usage of subchannels (O-FUSC), which differs from FUSC by spacing pilots eight data subcarriers apart and rotates locations by three subcarriers for each OFDM symbol rather than distributing the pilots in a pseudo-random way; optional partial usage of subchannels (O-PUSC), which differs from PUSC by using tiles sized three subcarriers by three OFDM symbols rather than four subcarriers by three OFDM symbols; adaptive modulation and coding or adjacent subcarrier permutation (AMC), which splits the entire channel into nonoverlapping groups of nine contiguous physical subcarriers, and then maps subchannels to a single such group over six contiguous OFDM symbols or to two such contiguous groups over three contiguous OFDM symbols; or tile usage of subchannels (TUSC1 or TUSC2), which differ from PUSC and O-PUSC by using a different equation to pseudo-randomly allocate subcarriers to subchannels. These are merely examples, and other methods of permuting physical resource units 200 to logical resource units 300 may be used.

The wireless network 102, such as via the superordinate station 104, may allocate a number or logical resource units 300 to each of the mobile stations 106, 108, 110, 112, 114, 116 for uplink and/or downlink communication based on a determined need of the mobile station 106, 108, 110, 112, 114, 116. The superordinate station 104 may assign or allocate a number of logical resource units 300 to each of the mobile stations 106, 108, 110, 112, 114, 116 based on the determined need according to an adaptive modulation and encoding scheme. The determined need may be based on channel or radio link conditions; for example, where the channel conditions are good, a modulation scheme with a high coding rate such as 16QAM or 64QAM may be used, with fewer logical resource units 300 needing to be allocated for a given data rate. Similarly, in cases of poor channel or radio link conditions, lower coding rate modulation schemes, such as BPSK or QPSK, may be used, which may require more logical resource units 300 to be allocated to a given mobile station 106, 108, 110, 112, 114, 116 for a given data rate. The superordinate station 104 may also determine the number of logical resource units 300 to assign to each mobile station 106, 108, 110, 112, 114, 116 based on other factors, such as the type of data to be transmitted, a priority level of the user, fairness considerations, or other factors.

The superordinate station 104 may allocate the logical resource units 300, which are mapped to physical resource units 200, to the mobile stations 106, 108, 110, 112, 114, 116 by sending allocations messages to the mobile stations 106, 108, 110, 112, 114, 116. The superordinate station 104 may allocate the logical resource units 300 to the mobile stations 106, 108, 110, 112, 114, 116 by broadcasting a single allocation message which includes logical resource unit allocations for all the mobile stations 106, 108, 110, 112, 114, 116, or may send a separate allocation message allocating logical resource units 300 to each of the mobile stations 106, 108, 110, 112, 114, 116. The superordinate station 104 may allocate logical resource units 300 for both uplink and downlink communication in a single allocation message, or may send separate allocation messages allocating logical resource units 300 or uplink and downlink communication. In an example embodiment, the allocation messages may be MAP Information Elements (MAP IEs).

Figure 4:
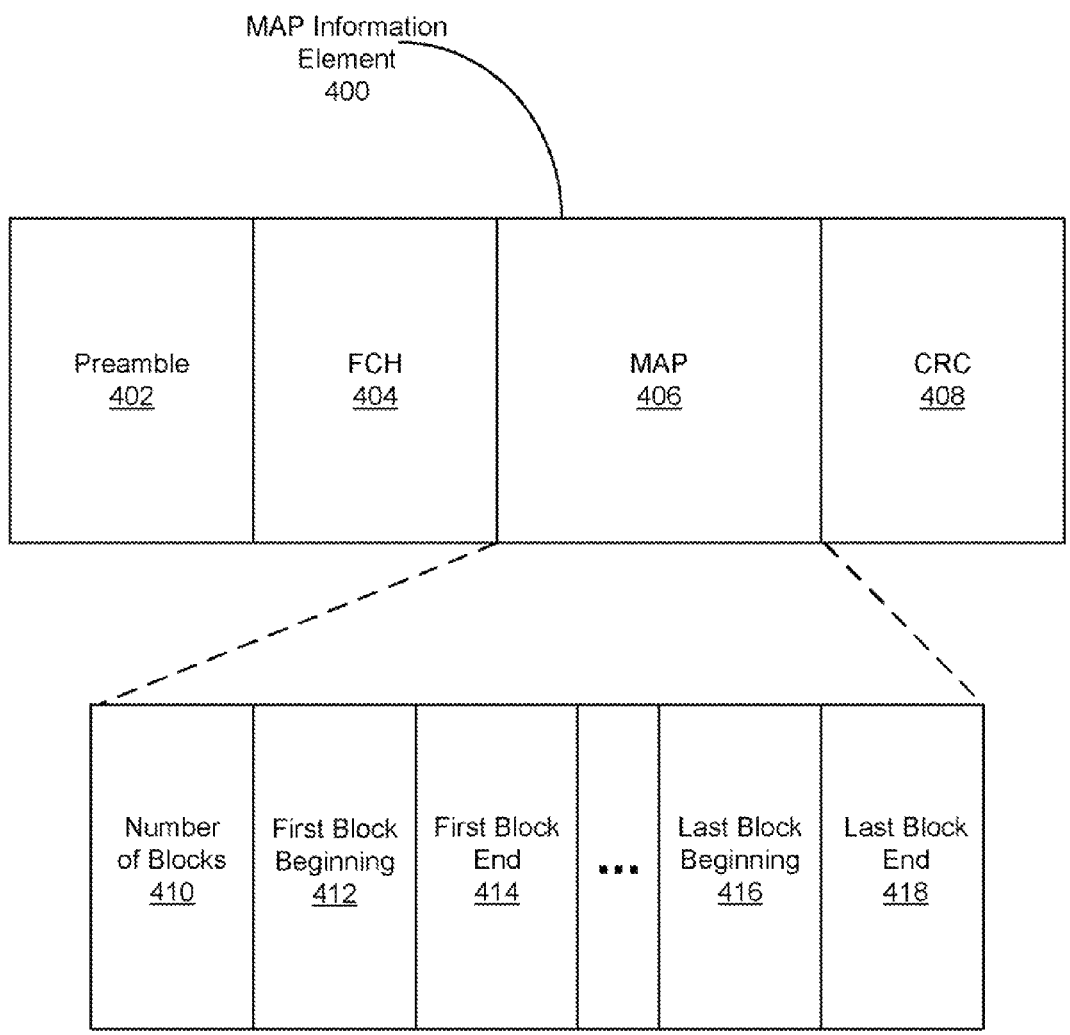
FIG. 4 shows a MAP Information Element frame according to an example embodiment.

FIG. 4 shows a MAP Information Element (MAP IE) 400 frame according to an example embodiment. The superordinate node 104 may send the MAP IE 400 to the mobile stations 106, 108, 110, 112, 114, 116, thereby allocating the logical resource units 300 to the mobile stations 106, 108, 110, 112, 114, 116.

The MAP IE 400 may include a preamble field 402. The preamble field 402 may include signals and/or data which allow the mobile stations 106, 108, 110, 112, 114, 116 to perform amplifier adjustments, frequency correction, time correction, and/or channel estimation. The MAP IE 400 may also include a frame control header (FCH) 404. The FCH 404 may specify a burst profile and a length of one or more DL bursts which may follow the FCH 404. The FCH 404 may also include signals and/or data which the mobile station 106, 108, 110, 112, 114, 116 may decode to determine whether the MAP IE allocates logical resource units 300 for the respective mobile station 106, 108, 110, 112, 114, 116, or for another mobile station 106, 108, 110, 112, 114, 116.

The MAP IE 400 may also include a MAP field 406. The MAP field 406 may indicate the logical resource units 300 which are allocated to the respective mobile station 106, 108, 110, 112, 114, 116. In an example embodiment, the MAP field 406 may include a number of blocks subfield 410. The number of blocks subfield 410 may indicate a number of blocks in which the logical resource units 300 are allocated. The blocks may be sequential or consecutive logical resource units. For each block in which the logical resource units 300 are allocated, the MAP field 406 may include a block beginning subfield 412, 416 and a block end subfield 414, 418. The block beginning subfield 412, 416 may indicate a number, such as an index number, of the first logical resource unit 300 in the block. The block end subfield 414, 418 may indicate an end of the block, such as by indicating the number, such as the index number, of the last logical resource unit in the block, or by indicating a length of the block. The number of block beginning subfields 412, 416 and block end subfields 414, 418 may correspond to the number of blocks indicated by the number of blocks subfield 410.

The MAP IE 400 may also include a cyclic redundancy check (CRC) field 408. The CRC field 408 may include signals and/or data which, when decoded, may be used to determine whether the data in the MAP IE 400 were correctly received or not correctly received.

In an example embodiment, the superordinate node 104 may allocate the logical resource units 300 to the mobile stations 106, 108, 110, 112, 114, 116 according to a persistent or semi-persistent scheduling method. The superordinate node 104 may allocate the logical resource units 300 to the mobile stations 106, 108, 110, 112, 114, 116 according to a persistent or semi-persistent scheduling method in situations in which the data transmission occurs regularly and involves relatively small payloads, for example. One such example may be Voice over Internet Protocol (VoIP). In persistent or semi-persistent scheduling, the allocation message or MAP IE 400 may indicate that the allocation of logical resource units 300 will apply until further notice. Thus, in persistent or semi-persistent scheduling, once the logical resource units 300 have been allocated to the mobile stations 106, 108, 110, 112, 114, 116, no further allocation messages or MAP IEs 400 need to be sent until the resource needs of the mobile stations 106, 108, 110, 112, 114, 116 changes, such as when a mobile station 106, 108, 110, 112, 114, 116 begins web browsing or exits the wireless network 102, or another mobile station 106, 108, 110, 112, 114, 116 enters the wireless network. Thus, the blocks of logical resource units 300 assigned by the allocation message or MAP IE 400 remain fixed until the superordinate node 104 changes the allocation of logical resource units 300, such as by sending a de-allocation message or another MAP IE 400 de-allocating the logical resource units 300.

Figure 5:
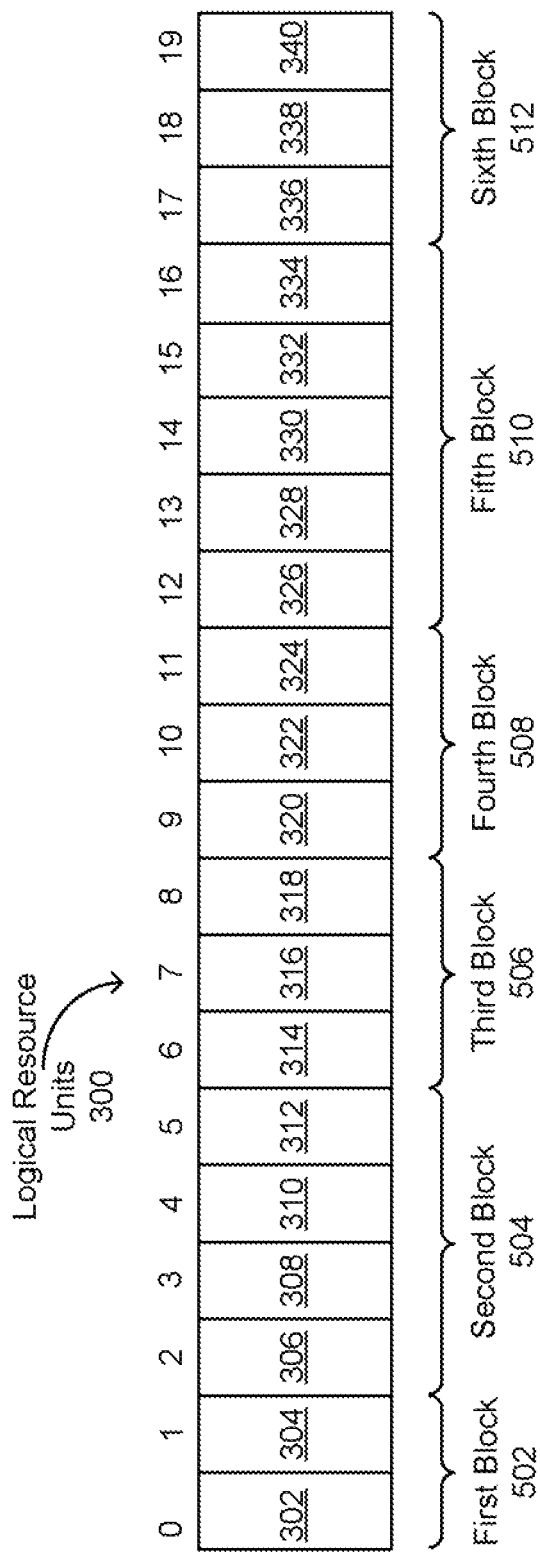
FIG. 5 shows blocks of logical resource units according to an example embodiment.

FIG. 5 shows blocks 502, 504, 506, 508, 510, 512 of logical resource units 300 according to an example embodiment. The wireless network 102 or superordinate station 104 may allocate the logical resource units 300 to the mobile stations 106, 108, 110, 112, 114, 116 in blocks 502, 504, 506, 508, 510, 512 of sequential logical resource units 300. The blocks 502, 504, 506, 508, 510, 512 may have different numbers of logical resource units 300, based on the determination of resource needs made by the superordinate node 104 (described above in paragraph [0037]). In the example shown in FIG. 5, a first block 502 of two sequential logical resource units 302, 304 may be allocated to the first mobile station 106, a second block 504 of four sequential logical resource units 306, 308, 310, 312 may be allocated to the second mobile station 108, a third block 506 of three sequential logical resource units 314, 316, 318 may be allocated to the third mobile station 110, a fourth block 508 of sequential logical resource units 320, 322, 324 may be allocated to the fourth mobile station 112, a fifth block 510 of sequential logical resource units 326, 328, 330, 332, 334 may be allocated to the fifth mobile station 114, and a sixth block 512 of sequential logical resource units 336, 338, 340 may be allocated to the sixth mobile station 116. In this example, each of the blocks 502, 504, 506, 508, 510, 512 may be contiguous with at least one other block 502, 504, 506, 508, 510, 512.

As discussed above, while the logical resource units 300 allocated to a given mobile station 106, 108, 110, 112, 114, 116 may be sequential, the physical resource units 200 allocated to the same mobile station 106, 108, 110, 112, 114, 116 may be noncontiguous, due to the permutation in mapping logical resource units 300 to physical resource units 200 to achieve frequency diversity. Also, while these examples have been described with reference to permutations which achieve frequency diversity, the logical resource units 300 may have been mapped or permuted to the physical resource units 200 in such a manner as to additionally or alternatively allocate noncontiguous time slots, such as noncontiguous symbols 202, 204, 206, 208, 210, 212 to a mobile station 106, 108, 110, 112, 114, 116 within a block 502, 504, 506, 508, 510, 512.

Figure 6:
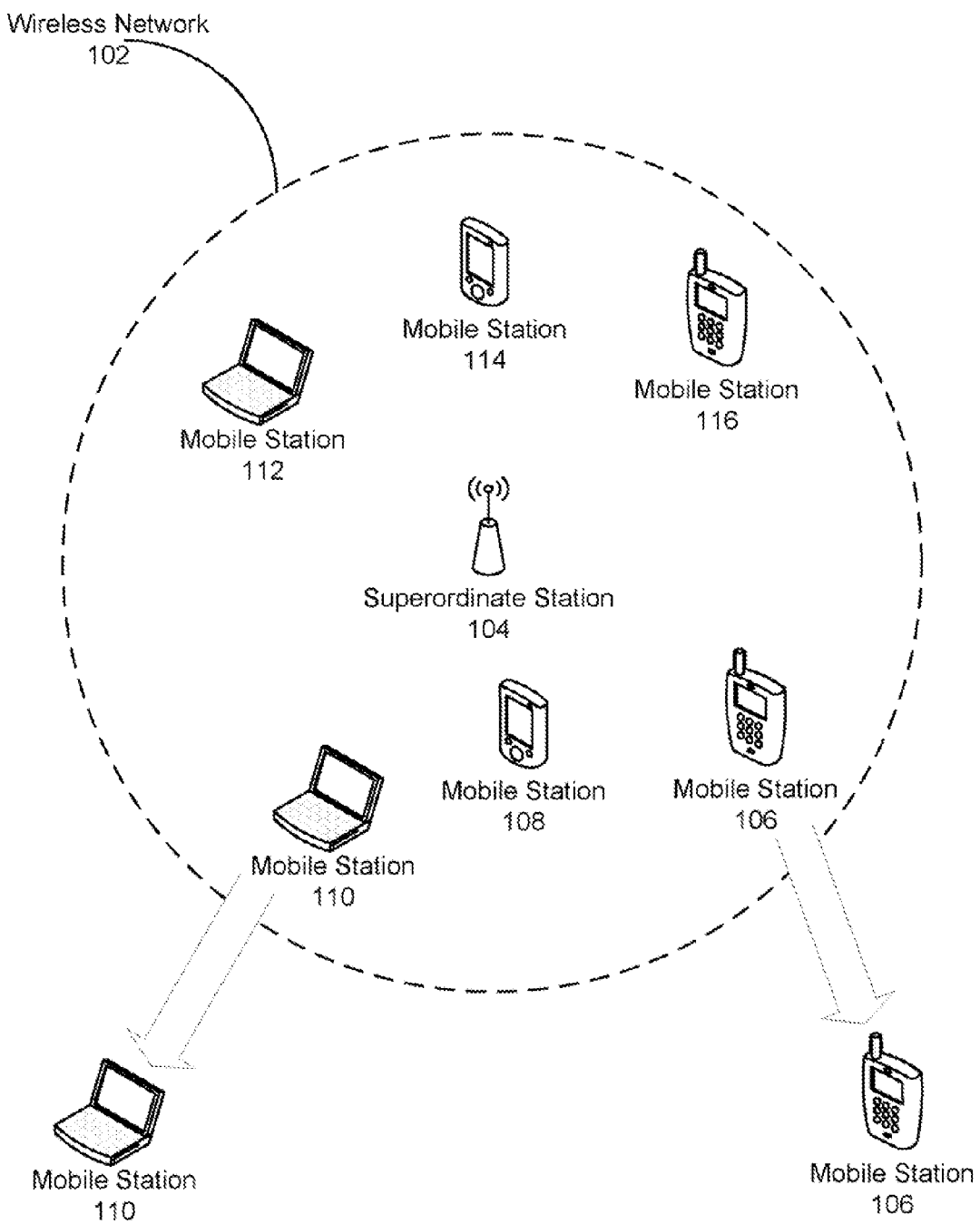
FIG. 6 shows two mobile stations leave the wireless network according to an example embodiment.

Mobile stations 106, 108, 110, 112, 114, 116 which have been allocated logical resource units 300 may thereafter leave the wireless network 102. FIG. 6 shows two mobile stations 106, 110 leave the wireless network 102 according to an example embodiment. In this example, the first mobile station 106, which was allocated the first block 502 of two sequential logical resource units 302, 304, and the third mobile station 110, which was allocated the third block 506 of three logical resource units 314, 316, 318, exit the wireless network 102. The first mobile station 106 and third mobile station 110 may exit the wireless network 102 by powering off, or by entering a cell served by another superordinate node, for example.

Figure 7:
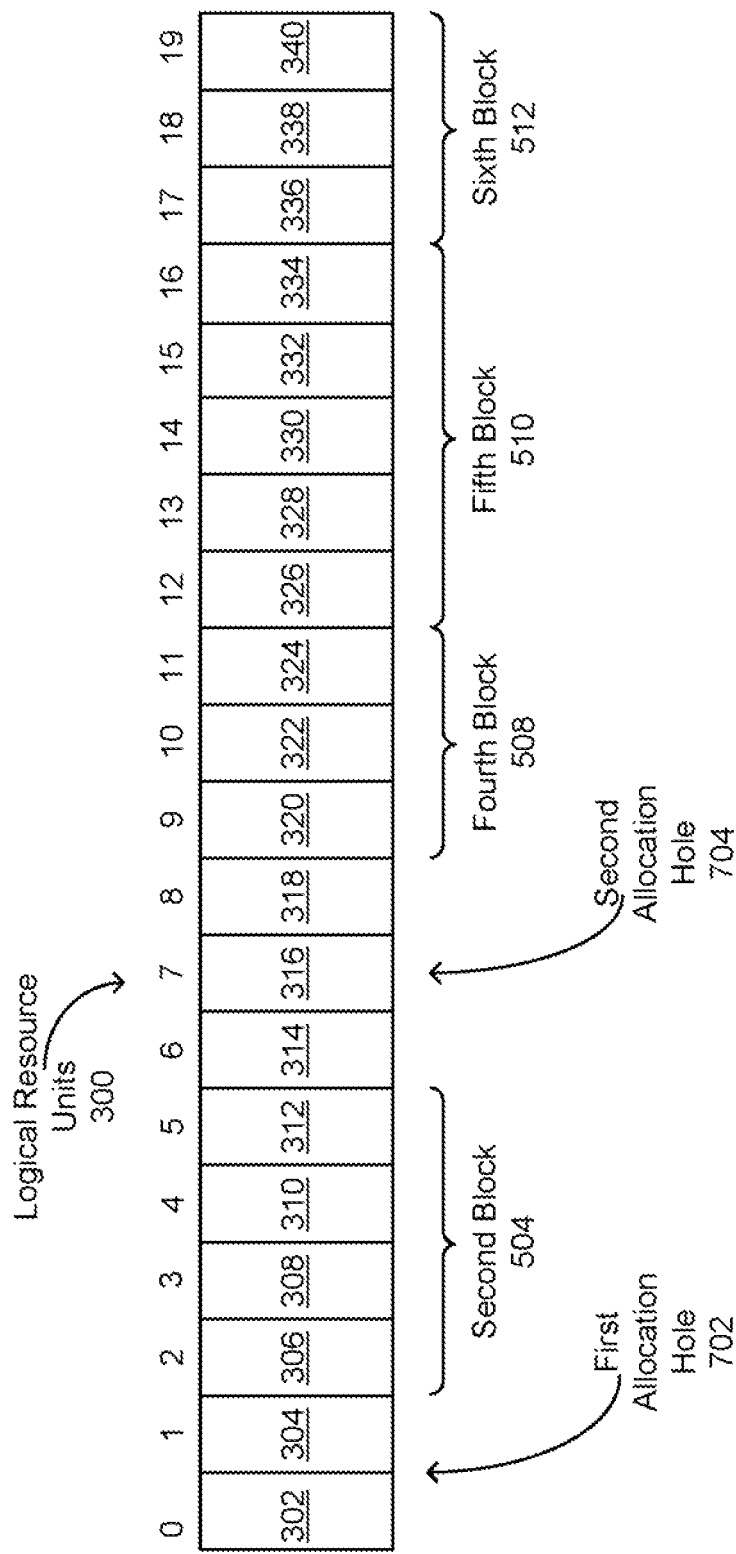
FIG. 7 shows allocation holes between blocks of logical resource units caused by the two mobile stations exiting the wireless network according to an example embodiment.

FIG. 7 shows allocation holes 702, 704 between blocks of logical resource units 300 caused by the two mobile stations 106, 110 exiting the wireless network 102 according to an example embodiment. In this example, the first mobile station 106 and the third mobile station 110 exited the wireless network 102, leaving logical resource units 302, 304, 314, 316, 318 unallocated. The superordinate node 104 may have de-allocated these logical resource units 302, 304, 314, 316, 318 from the first mobile station 106 and the third mobile station 110. The de-allocated logical resource units 302, 304, 314, 316, 318 may not all be sequential, and the first block 502 or first allocation hole 702 may not be contiguous with the third block 506 or the second allocation hole 704.

Figure 8:
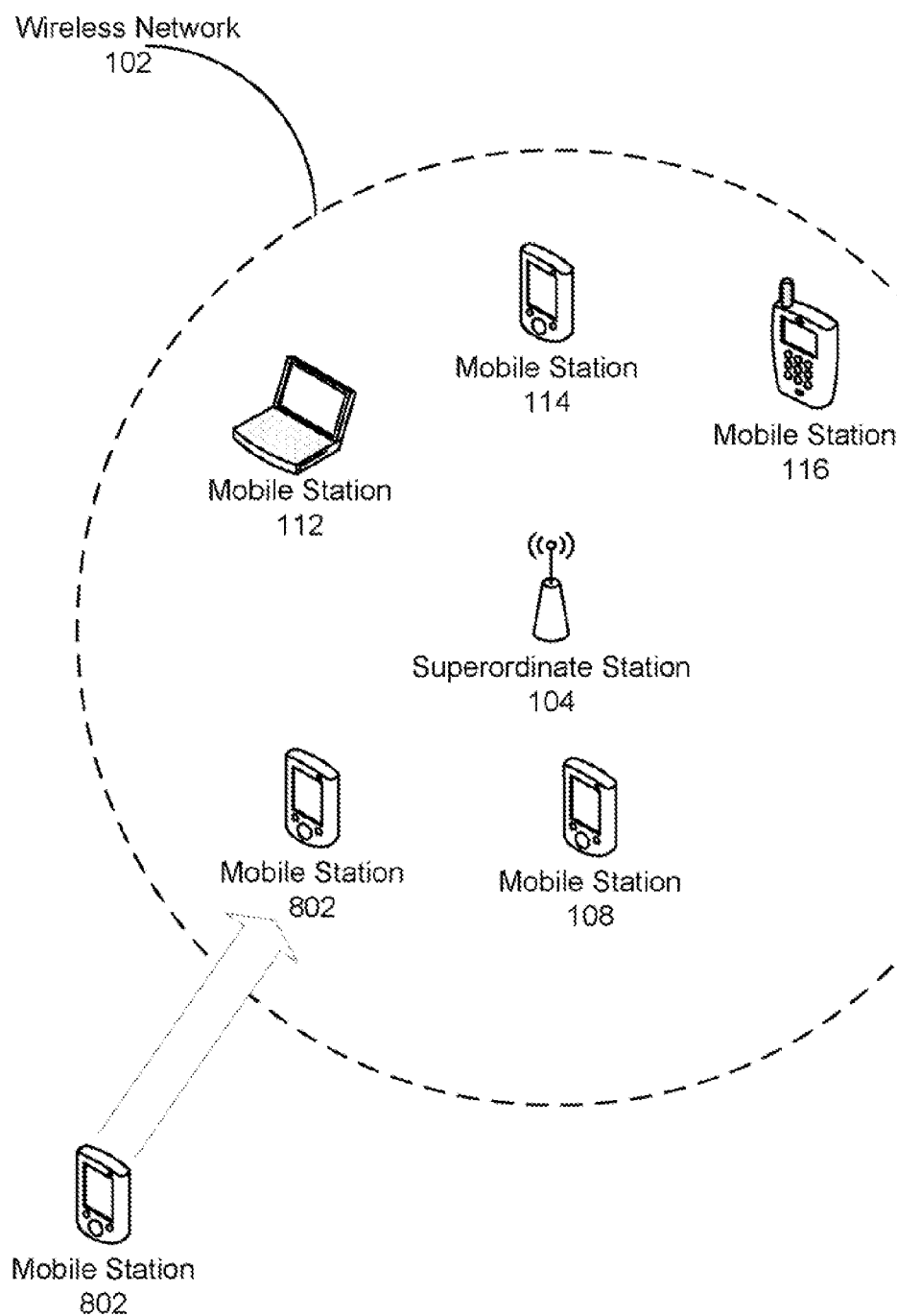
FIG. 8 shows a new mobile station entering the wireless network according to an example embodiment.

FIG. 8 shows a new mobile station 802 entering the wireless network 102 according to an example embodiment. The new mobile station 802 may enter the wireless network 102 and perform initialization procedures with the superordinate station 104, such as a ranging request and response. The superordinate station 104 may determine the resource needs of the new mobile station 802, such as the number of logical resource units 300 needed for the new mobile station 802 to communicate with the superordinate station 104. The superordinate station 104 may determine that the number of logical resource units 300 needed to provide service to the new mobile station 802 exceeds the number of logical resource units 300 de-allocated from either the first mobile station 106 or the third mobile station 110. In this example, the superordinate station 104 may have determined that four logical resource units 300 are required to provide service to the new mobile station 802. Thus, the superordinate station 104 may not be able to allocate sufficient logical resource units 300 to provide service to the new mobile station 802 by allocating the logical resource units 300 from either the first allocation hole 702 or the second allocation hole 704 to the new mobile station.

In an example embodiment, the superordinate station 104 may allocate some logical resource units 300 from each of the first allocation hole 702 and the second allocation hole 704 to the new mobile station 802. The combination of logical resource units from both the first allocation hole 702 and the second allocation hole 704 may be sufficient to provide service to the new mobile station 802.

Figure 9:
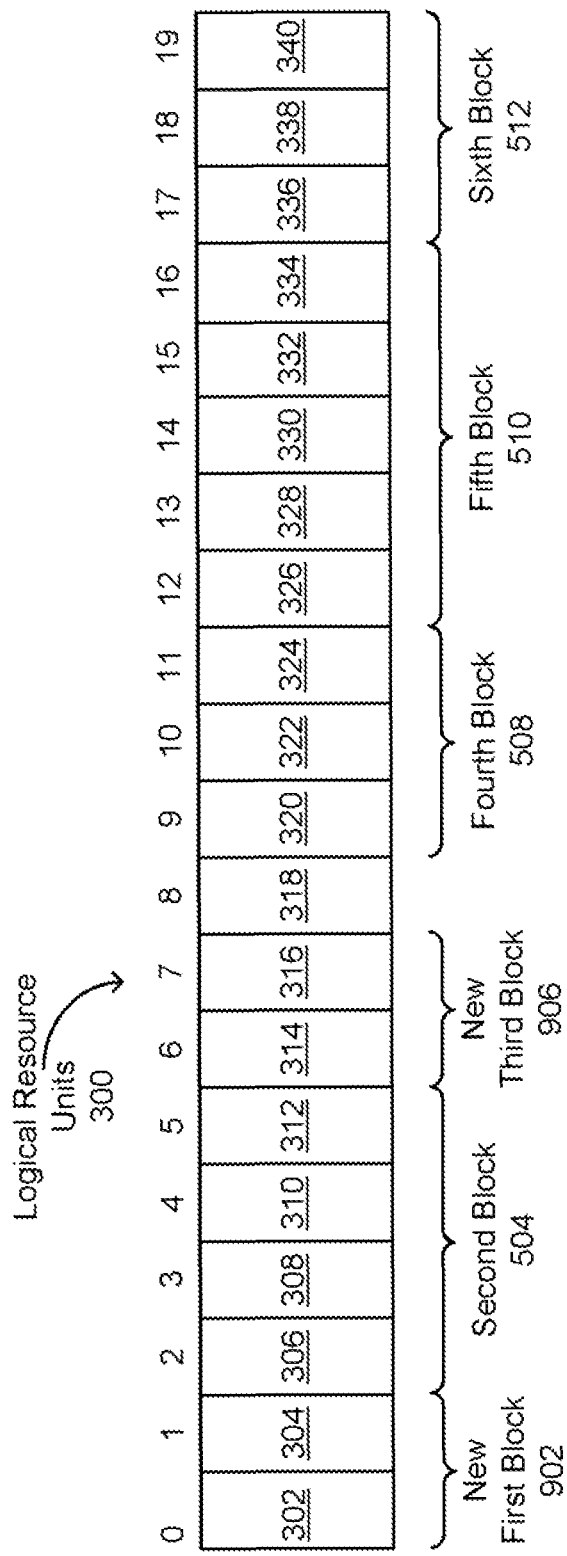
FIG. 9 shows logical resource units from the allocation holes allocated to the new mobile station according to an example embodiment.

FIG. 9 shows logical resource units 302, 304, 314, 316 from the allocation holes 702, 704 (not shown if FIG. 9) allocated to the new mobile station 802 according to an example embodiment. In this example, the logical resource units 302, 304 form a new first block 902 allocated to the new mobile station 802, and the logical resource units 314, 316 form a new third block 906 allocated to the new mobile station. The new first block 902 and the new third block 906 may be non-contiguous in the logical resource map of sequential logical resource units 300, and the logical resource units 302, 304, 314, 316 allocated to the new mobile station 802 may not all be sequential. In this example, the logical resource units 302, 304 included in the new first block and which were previously included in the first block 502 are allocated to the new mobile station 802, and some of the logical resource units 314, 316 from the third block 506 form the new third block 906, which is allocated to the new mobile station 802.

Figure 10:
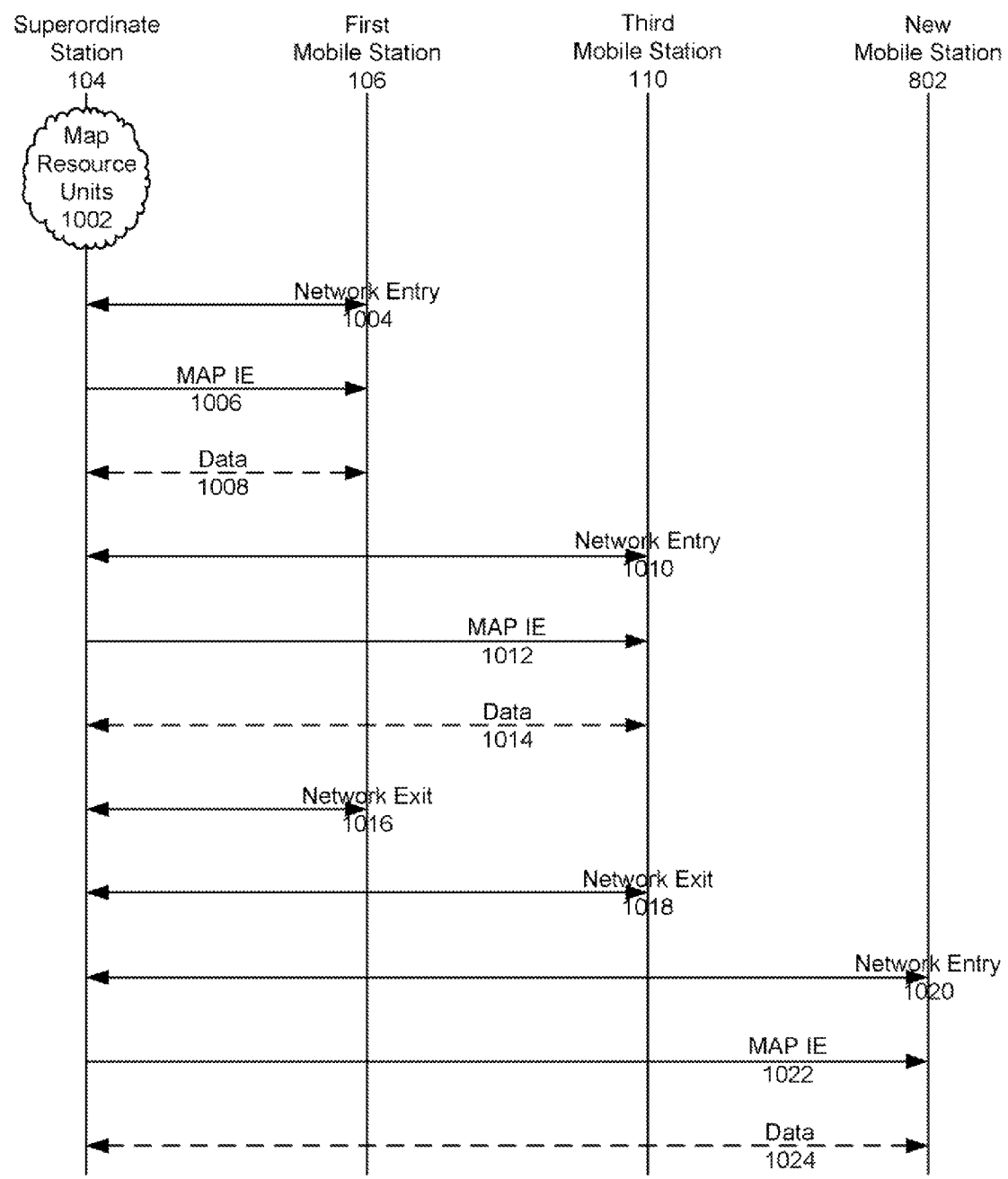
FIG. 10 shows communications between the superordinate station and mobile stations according to an example embodiment.

FIG. 10 shows communications between the superordinate station 104 and mobile stations 106, 110, 802 according to an example embodiment. In this example, the superordinate station 104 may map the resource units (1002), such as by permuting the physical resource units 200 to the logical resource units 300, with the physical resource units of sequential logical resource units being noncontiguous. The first mobile station 106 may enter the wireless network 102 and initialize with the superordinate station 104, such as by exchanging ranging request and ranging response messages (1004). The superordinate station 104 may send an allocation message or MAP IE (1006) to the first mobile station 106, allocating logical resource units 300 to the first mobile station 106. The allocation message or MAP IE may allocate a block 306 of sequential logical resource units 300 to the third mobile station 110. After the superordinate station 104 has allocated the logical resource units 300 to the first mobile station 106, the superordinate station 104 and the first mobile station 106 may exchange data (1008) via the physical resource units 200 mapped to the allocated logical resource units 300.

Similarly, the third mobile station 110 may enter the wireless network 102 and initialize with the superordinate station 104, such as by exchanging ranging request and ranging response messages (1010). The superordinate station 104 may send an allocation message or MAP IE (1012) to the third mobile station 110, allocating logical resource units 300 to the third mobile station 110. The allocation message or MAP IE may allocate a block 306 of sequential logical resource units 300 to the third mobile station 110. After the superordinate station 104 has allocated the logical resource units 300 to the third mobile station 110, the superordinate station 104 and the third mobile station 110 may exchange data (1014) via the physical resource units 200 mapped to the allocated logical resource units 300.

The first mobile station 106 and third mobile station 110 may exit the network 102 (1016, 1018). After or upon the first mobile station 106 and third mobile station 110 exiting the network 102, the superordinate station 104 may de-allocate the logical resource units 300 previously allocated to the first mobile station 106 and the second mobile station 110.

The new mobile station 802 may thereafter enter the wireless network 102 and initialize with the superordinate station 104, such as by exchanging ranging request and ranging response messages (1020). The superordinate station 104 may send an allocation message or MAP IE (1022) to the new mobile station 802, allocating logical resource units 300 to the new mobile station 802. The allocation message or MAP IE may allocate logical resource units 300 from the block 502 previously allocated to the first mobile station 106, and may allocate some or all of the logical resource units 300 from the block 506 previously allocated to the third mobile station 110. The first block 502 and third block 506 may be noncontiguous, and not all of the logical resource units 300 allocated to the new mobile station 802 may be sequential. After the superordinate station 104 has allocated the logical resource units 300 to the new mobile station 802, the superordinate station 104 and the new mobile station 802 may exchange data (1024) via the physical resource units 200 mapped to the allocated logical resource units 300.

Figure 11:
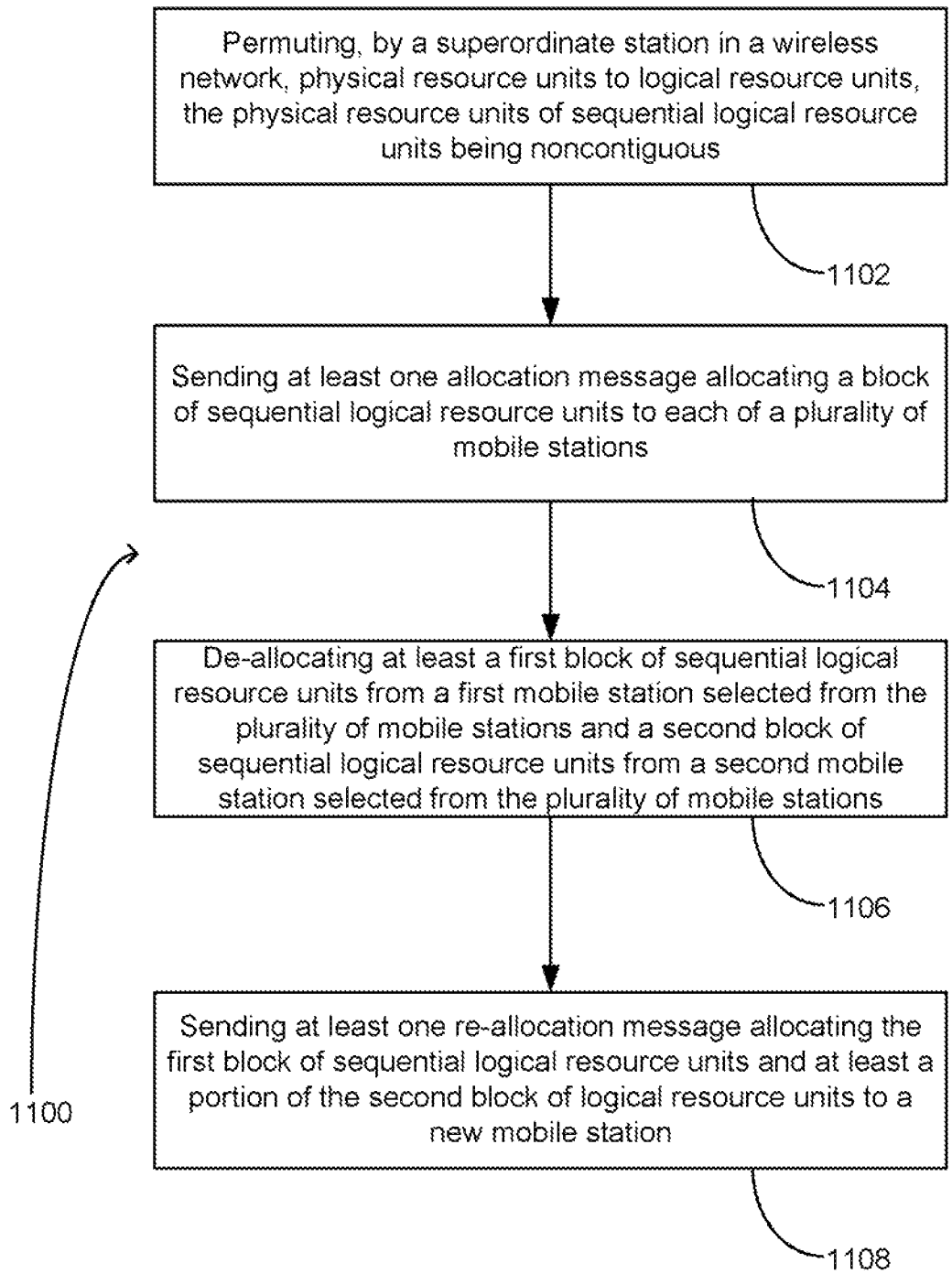
FIG. 11 shows a method according to an example embodiment.

FIG. 11 shows a method 1100 according to an example embodiment. In this example, the method 1100 may include permuting, by a superordinate station in a wireless network, physical resource units to logical resource units, the physical resource units of sequential logical resource units being noncontiguous (1102). The method 1100 may also include sending at least one allocation message allocating a block of sequential logical resource units to each of a plurality of mobile stations, each of the allocated blocks being contiguous with at least one other allocated block (1104). The method 1100 may also include de-allocating at least a first block of sequential logical resource units from a first mobile station selected from the plurality of mobile stations and a second block of sequential logical resource units from a second mobile station selected from the plurality of mobile stations, the first block of sequential logical resource units being non-contiguous with the second block of logical resource units (1106). The method 1100 may also include sending at least one re-allocation message allocating the first block of sequential logical resource units and at least a portion of the second block of logical resource units to a new mobile station (1108).

According to an example embodiment, the physical resource units permuted to the first block of sequential logical resource units and the second block of sequential logical resource units may be included in a single carrier.

According to an example embodiment, the method 1100 may also include determining a modulation and coding scheme for each of the plurality of mobile stations and the new mobile station based at least in part on a channel quality associated with the respective mobile station. In this example, the at least one allocation message allocating the block of sequential logical resource units to each of the plurality of mobile stations may include allocating a number of logical resource units to each of the plurality of mobile stations based at least in part on the determined modulation and coding scheme. Also in this example, the sending the at least one re-allocation message allocating the logical resource units to the new mobile station may include allocating a number of logical resource units to the new mobile station based at least in part on the determined modulation and coding scheme.

According to an example embodiment, the sending the at least one re-allocation message allocating the first block of sequential logical resource units and at least the portion of the second block of logical resource units to the new mobile station may include sending a MAP information element to the new mobile station, the MAP information element including a MAP indicating the logical resource units allocated to the new mobile station.

According to an example embodiment, the sending the at least one allocation message allocating the block of sequential logical resource units to each of the plurality of mobile stations may be performed in response to the plurality of mobile stations entering a cell served by the superordinate station. In this example, the de-allocating at least the first block of sequential logical resource units from the first mobile station selected from the plurality of mobile stations and the second block of sequential logical resource units from the second mobile station selected from the plurality of mobile stations may be performed in response to the first mobile station and the second mobile station exiting the cell served by the superordinate station. Also in this example, the sending the at least one re-allocation message allocating the first block of sequential logical resource units and at least the portion of the second block of logical resource units to the new mobile station may be performed in response to the new mobile station entering the cell served by the superordinate station.

According to an example embodiment, the sending the at least one allocation message allocating the block of sequential logical resource units to each of the plurality of mobile stations may include persistently or semi-persistently scheduling data transmission for each of the plurality of mobile stations. Also in this example, the sending the at least one re-allocation message allocating the first block of sequential logical resource units and at least the portion of the second block of logical resource units to the new mobile station may include persistently or semi-persistently scheduling data transmission for the new mobile station.

According to an example embodiment, the superordinate station may include an IEEE 802.16 Worldwide Interoperability for Microwave Access (WiMAX) base station.

According to an example embodiment, the superordinate station may include an IEEE 802.16 Worldwide Interoperability for Microwave Access (WiMAX) relay station.

According to an example embodiment, the superordinate station may include a Third Generation Partnership Project (3GPP) Long-Term Evolution (LTE) base station.

According to an example embodiment, each of the physical resource units may include a number of orthogonal frequency division multiple access (OFDMA) symbols in a time domain and a number of subcarriers in a frequency domain.

According to an example embodiment, each of the physical resource units may include a resource block including twelve subcarriers during seven orthogonal frequency division multiplexing (OFDM) symbols.

Figure 12:
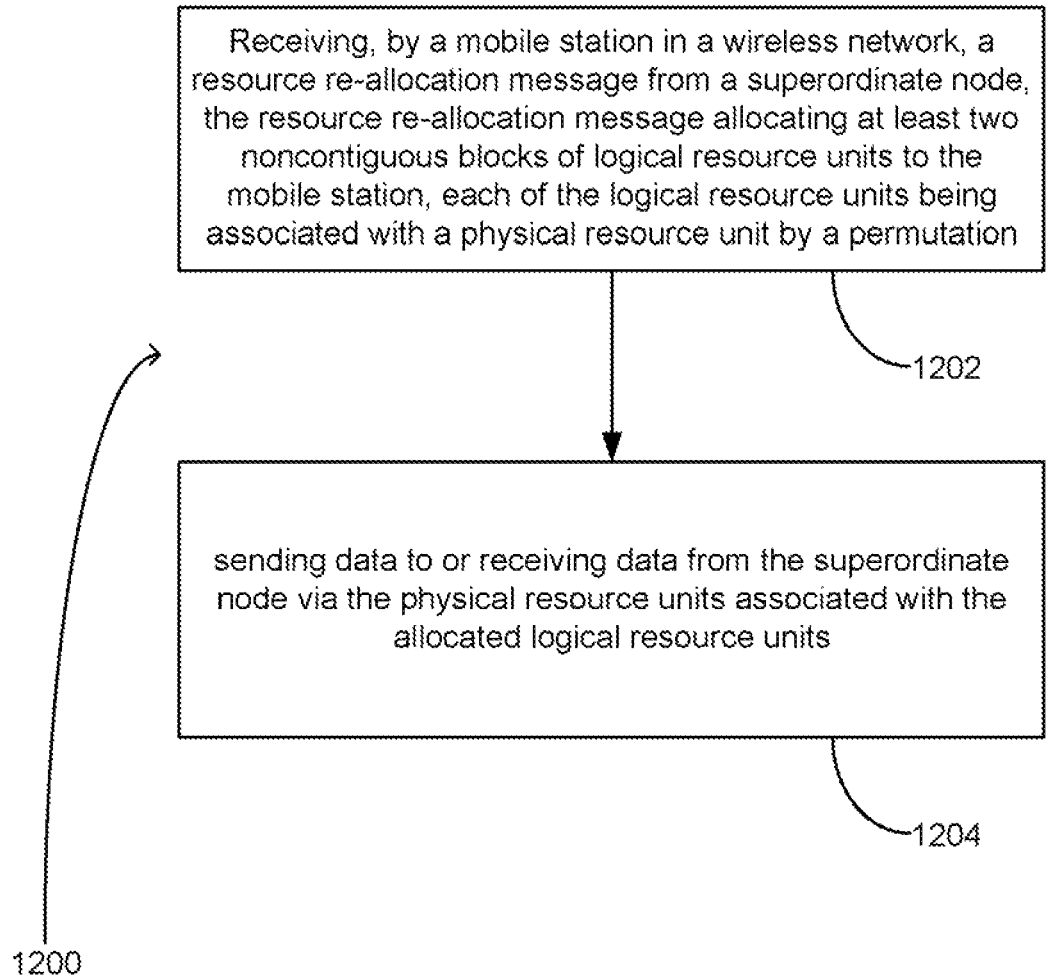
FIG. 12 shows a method according to another example embodiment.

FIG. 12 shows a method 1200 according to another example embodiment. According to this example, the method 1200 may include receiving, by a mobile station in a wireless network, a resource re-allocation message from a superordinate node, the resource re-allocation message allocating at least two noncontiguous blocks of logical resource units to the mobile station, each of the logical resource units being associated with a physical resource unit by a permutation (1202). The method 1200 may also include sending data to or receiving data from the superordinate node via the physical resource units associated with the allocated logical resource units (1204).

According to an example embodiment, physical resource units associated with the at least two allocated noncontiguous blocks of logical resource units may be included in a single carrier.

According to an example embodiment, the sending data to or receiving data from the superordinate node may include sending data to the superordinate node via the physical resource units associated with the allocated logical resource units.

According to an example embodiment, the sending data to or receiving data from the superordinate node may include receiving data from the superordinate node via the physical resource units associated with the allocated logical resource units.

According to an example embodiment, the mobile station may include an IEEE 802.16 Worldwide Interoperability for Microwave Access (WiMAX) mobile station.

According to an example embodiment, the mobile station may include a Third Generation Partnership Project (3GPP) Long-Term Evolution (LTE) mobile station.

According to an example embodiment, each of the physical resource units may include a number of orthogonal frequency division multiple access (OFDMA) symbols in a time domain and a number of subcarriers in a frequency domain.

According to an example embodiment, each physical resource unit may include a resource block including twelve subcarriers during seven orthogonal frequency division multiplexing (OFDM) symbols.

Figure 13:
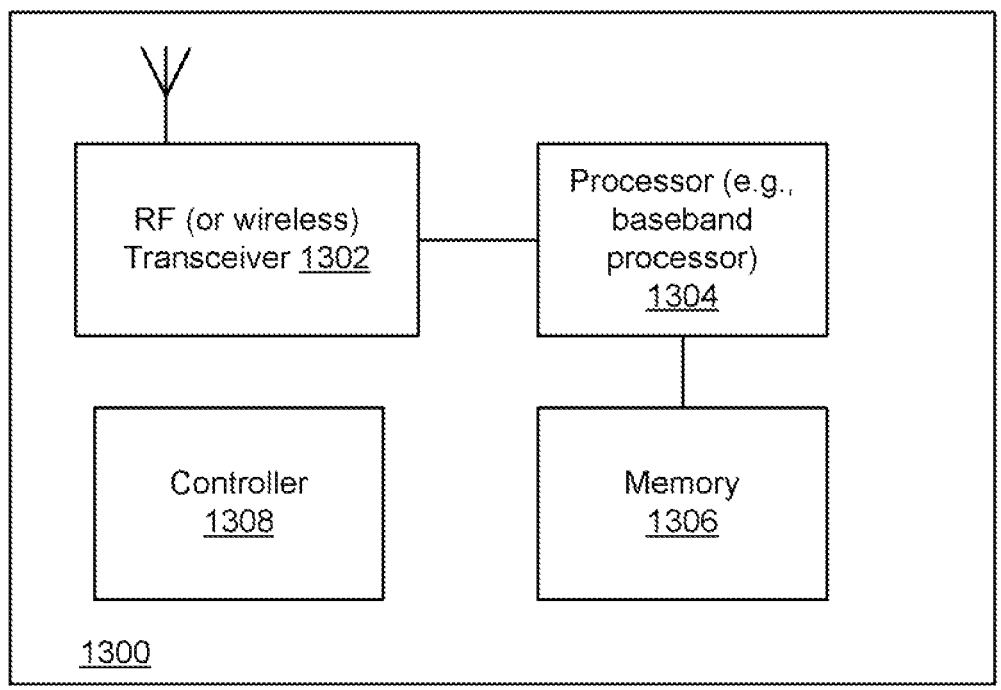
FIG. 13 shows a wireless station according to an example embodiment.

FIG. 13 is a block diagram of a wireless station (or wireless node) 1300 according to an example embodiment. The wireless station 1300 (e.g., superordinate station 104 or mobile station 106, 108, 110, 112, 114, 116, 802) may include, for example, an RF (radio frequency) or wireless transceiver 1302, including a transmitter to transmit signals and a receiver to receive signals, a processor 1304 to execute instructions or software and control transmission and receptions of signals, and a memory 1306 to store data and/or instructions.

Processor 1304 may also make decisions or determinations, generate frames or messages for transmission, decode received frames or messages for further processing, and other tasks or functions described herein. Processor 1304, which may be a baseband processor, for example, may generate messages, packets, frames or other signals (such as those described above) for transmission via wireless transceiver 1302. Processor 1304 may control transmission of signals or messages over a wireless network, and may receive signals or messages, etc., via a wireless network (e.g., after being down-converted by wireless transceiver 1302, for example). Processor 1304 may be programmable and capable of executing software or other instructions stored in memory or on other computer media to perform the various tasks and functions described above, such as one or more of the tasks or methods described above. Processor 1304 may be (or may include), for example, hardware, programmable logic, a programmable processor that executes software or firmware, and/or any combination of these. Using other terminology, processor 1304 and transceiver 1302 together may be considered as a wireless transmitter/receiver system, for example.

In addition, referring to FIG. 13, a controller (or processor) 1308 may execute software and instructions, and may provide overall control for the station 1300, and may provide control for other systems not shown in FIG. 13, such as controlling input/output devices (e.g., display, keypad), and/or may execute software for one or more applications that may be provided on wireless station 1300, such as, for example, an email program, audio/video applications, a word processor, a Voice over IP application, or other application or software.

In addition, a storage medium such as the memory 1306 may be provided that includes stored instructions, which when executed by a controller or processor may result in the processor 1304, or other controller or processor, performing one or more of the functions or tasks described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method comprising:
permuting, by a superordinate station in a wireless network, physical resource units to logical resource units, the physical resource units of sequential logical resource units being noncontiguous;
in response to a plurality of mobile stations entering a cell served by the superordinate station, sending at least one allocation message allocating a block of sequential logical resource units to each of the plurality of mobile stations, each of the allocated blocks being contiguous with at least one other allocated block;
in response to a first mobile station selected from the plurality of mobile stations exiting the cell served by the superordinate station and a second mobile station selected from the plurality of mobile stations exiting the cell served by the superordinate station, de-allocating at least a first block of sequential logical resource units from the first mobile station and a second block of sequential logical resource units from the second mobile station, the first block of sequential logical resource units being noncontiguous with the second block of logical resource units; and
in response to a new mobile station entering the cell served by the superordinate station, sending at least one re-allocation message allocating the first block of sequential logical resource units and at least a portion of the second block of logical resource units to the new mobile station.

2. The method of claim 1, wherein the physical resource units permuted to the first block of sequential logical resource units and the second block of sequential logical resource units are included in a single carrier.

3. The method of claim 1, further comprising:
determining a modulation and coding scheme for each of the plurality of mobile stations and the new mobile station based at least in part on a channel quality associated with the respective mobile station,
wherein the sending the at least one allocation message allocating the block of sequential logical resource units to each of the plurality of mobile stations includes allocating a number of logical resource units to each of the plurality of mobile stations based at least in part on the determined modulation and coding scheme, and wherein the sending the at least one re-allocation message allocating the logical resource units to the new mobile station includes allocating a number of logical resource units to the new mobile station based at least in part on the determined modulation and coding scheme.

4. The method of claim 1, wherein:
the sending the at least one re-allocation message allocating the first block of sequential logical resource units and at least the portion of the second block of logical resource units to the new mobile station includes sending a MAP information element to the new mobile station, the MAP information element including a MAP indicating the logical resource units allocated to the new mobile station.

5. A method comprising:
permuting, by a superordinate station in a wireless network, physical resource units to logical resource units, the physical resource units of sequential logical resource units being noncontiguous;
sending at least one allocation message allocating a block of sequential logical resource units to each of a plurality of mobile stations, each of the allocated blocks being contiguous with at least one other allocated block, including persistently or semi-persistently scheduling data transmission for each of the plurality of mobile stations;
de-allocating at least a first block of sequential logical resource units from a first mobile station selected from the plurality of mobile stations and a second block of sequential logical resource units from a second mobile station selected from the plurality of mobile stations, the first block of sequential logical resource units being noncontiguous with the second block of logical resource units; and
sending at least one re-allocation message allocating the first block of sequential logical resource units and at least a portion of the second block of logical resource units to a new mobile station, including persistently or semi-persistently scheduling data transmission for the new mobile station,
wherein the physical resource units permuted to the first block of sequential logical resource units and the second block of sequential logical resource units are included in a single carrier.

6. The method of claim 1, wherein the superordinate station includes at least one of an IEEE 802.16 Worldwide Interoperability for Microwave Access (WiMAX) base station, an IEEE 802.16 WiMAX relay station, or a 3GPP LTE base station.

7. The method of claim 1, wherein each of the physical resource units includes a resource block including twelve subcarriers in a frequency domain and seven orthogonal frequency division multiplexing (OFDM) symbols in a time domain.

8. An apparatus comprising:
a processor configured to:
permute physical resource units to logical resource units, the physical resource units of sequential logical resource units being noncontiguous;
in response to a plurality of mobile stations entering a cell served by the apparatus, generate at least one allocation message allocating a block of sequential logical resource units to each of the plurality of mobile stations, each of the allocated blocks being contiguous with at least one other allocated block;
in response to a first mobile station selected from the plurality of mobile stations exiting the cell served by the apparatus and a second mobile station selected from the plurality of mobile stations exiting the cell served by the apparatus, de-allocating at least a first block of sequential logical resource units from the first mobile station and a second block of sequential logical resource units from the second mobile station, the first block of sequential logical resource units being noncontiguous with the second block of logical resource units; and
in response to a new mobile station entering the cell served by the apparatus, generate at least one re-allocation message allocating the first block of sequential logical resource units and at least a portion of the second block of logical resource units to the new mobile station,
wherein:
the generating the at least one allocation message allocating the block of sequential logical resource units to each of the plurality of mobile stations includes persistently or semi-persistently scheduling data transmission for each of the plurality of mobile stations, and
the generating the at least one re-allocation message allocating the first block of sequential logical resource units and at least the portion of the second block of logical resource units to the new mobile station includes persistently or semi-persistently scheduling data transmission for the new mobile station and generating a MAP information element to the new mobile station, the MAP information element including a MAP indicating the logical resource units allocated to the new mobile station.

9. The apparatus of claim 8, wherein the physical resource units permuted to the first block of sequential logical resource units and the second block of sequential logical resource units are included in a single carrier.

10. The apparatus of claim 8, further comprising:
determining a modulation and coding scheme for each of the plurality of mobile stations and the new mobile station based at least in part on a channel quality associated with the respective mobile station,
wherein the generating the at least one allocation message allocating the block of sequential logical resource units to each of the plurality of mobile stations includes allocating a number of logical resource units to each of the plurality of mobile stations based at least in part on the determined modulation and coding scheme, and
wherein the generating the at least one re-allocation message allocating the logical resource units to the new mobile station includes allocating a number of logical resource units to the new mobile station based at least in part on the determined modulation and coding scheme.

11. The method of claim 5, further comprising:
determining a modulation and coding scheme for each of the plurality of mobile stations and the new mobile station based at least in part on a channel quality associated with the respective mobile station,
wherein the sending the at least one allocation message allocating the block of sequential logical resource units to each of the plurality of mobile stations includes allocating a number of logical resource units to each of the plurality of mobile stations based at least in part on the determined modulation and coding scheme, and
wherein the sending the at least one re-allocation message allocating the logical resource units to the new mobile station includes allocating a number of logical resource units to the new mobile station based at least in part on the determined modulation and coding scheme.

12. The method of claim 5, wherein:
the sending the at least one re-allocation message allocating the first block of sequential logical resource units and at least the portion of the second block of logical resource units to the new mobile station includes sending a MAP information element to the new mobile station, the MAP information element including a MAP indicating the logical resource units allocated to the new mobile station.

13. The method of claim 5, wherein:
the sending the at least one allocation message allocating the block of sequential logical resource units to each of the plurality of mobile stations is performed in response to the plurality of mobile stations entering a cell served by the superordinate station;
the de-allocating at least the first block of sequential logical resource units from the first mobile station selected from the plurality of mobile stations and the second block of sequential logical resource units from the second mobile station selected from the plurality of mobile stations is performed in response to the first mobile station and the second mobile station exiting the cell served by the superordinate station; and
the sending the at least one re-allocation message allocating the first block of sequential logical resource units and at least the portion of the second block of logical resource units to the new mobile station is performed in response to the new mobile station entering the cell served by the superordinate station.

\* \* \* \* \*